United States Patent [19]

Hill et al.

[11] Patent Number: 5,291,913
[45] Date of Patent: Mar. 8, 1994

[54] FLUID VALVE HAVING A ZIRCONIUM OXIDE COATED VALVE DISC

[75] Inventors: James C. Hill, Ogden; David W. Holt, Clearfield, both of Utah

[73] Assignee: Westinghouse Electric Corp., Pittsburgh, Pa.

[21] Appl. No.: 23,284

[22] Filed: Feb. 26, 1993

[51] Int. Cl.$^5$ .............................................. F16L 55/18
[52] U.S. Cl. ........................................ 137/15; 251/368
[58] Field of Search ............................ 251/368; 137/15

[56] References Cited

U.S. PATENT DOCUMENTS

| | | | |
|---|---|---|---|
| 4,269,391 | 5/1981 | Saito et al. | 251/368 |
| 4,784,178 | 11/1988 | Kasaya et al. | 251/368 |
| 4,808,092 | 2/1989 | Funke | 417/454 |

*Primary Examiner*—A. Michael Chambers
*Attorney, Agent, or Firm*—J. C. Valentine

[57] ABSTRACT

A fluid valve has a valve body with a valve seat for receiving a valve disc to close the valve. The valve seat is iron or steel. The valve disc is made of zirconium and has a zirconium oxide layer on disc surface which seats against the valve seat when the valve is closed. The valve has remained in a corrosive service for over six months where the original iron valves not having an oxide coated zirconium disc only lasted a few days.

5 Claims, 1 Drawing Sheet

5,291,913

FLUID VALVE HAVING A ZIRCONIUM OXIDE COATED VALVE DISC

BACKGROUND OF THE INVENTION

This invention relates to a fluid valve for use in highly corrosive environments and, more particularly, to a fluid valve having a valve disc with a zirconium oxide coated surface for closing on a valve seat.

Steel and cast iron are employed as structural materials for piping, valves and pumps throughout industrial plants because of their cost effectiveness and general suitability for many services. However, the service lives of many of these components may be drastically shortened by only trace amounts of corrosive species contaminating otherwise noncorrosive fluids. Thus, for example, check valves used in hydraulic lines of vacuum pumps employed in a chlorine gas service were found to last for only a few days because the highly corrosive nature of trace amounts of chlorine in the hydraulic fluid literally dissolved the movable valve discs which shut against the valve seat. Thus, a valve having a substantially longer service life is needed for this service.

U.S. Pat. No. 4,808,092 to Funke discloses a precision metering pump which employs cubic zirconium oxide pump and valve parts. This material is employed primarily because of its transparency, but also because of its chemical inertness. Funke discloses that the zirconium oxide parts are made by grinding a shape to final size and then polishing, which is a costly process.

SUMMARY OF THE INVENTION

It is an object of the present invention to provide an economical valve having a long service life in corrosive environments. It is another object of the present invention to provide an otherwise conventional valve body with a replaceable valve disc compatible with the valve body so that the valve disc can be backfit in existing inline valve body.

With these objects in view, the present invention resides in a fluid valve having a valve body with a valve seat for receiving a valve disc to close the valve. The valve seat is comprised of steel or iron. The valve disc is comprised of zirconium and has a zirconium oxide layer on the surface which shuts against the valve seat to close the valve. In a preferred embodiment, the layer is at least five (5) ten-thousandths thick.

It has been found that such a valve has lasted for more than six months in the above mentioned service where a chlorine-contaminated hydraulic oil dissolved the original valve in only a few days.

DESCRIPTION OF THE DRAWINGS

The invention will become more readily apparent from the following description of two preferred embodiments thereof shown, by way of example only, in the accompanying drawings wherein.

DESCRIPTION OF A PREFERRED PRACTICE

Figure 1:
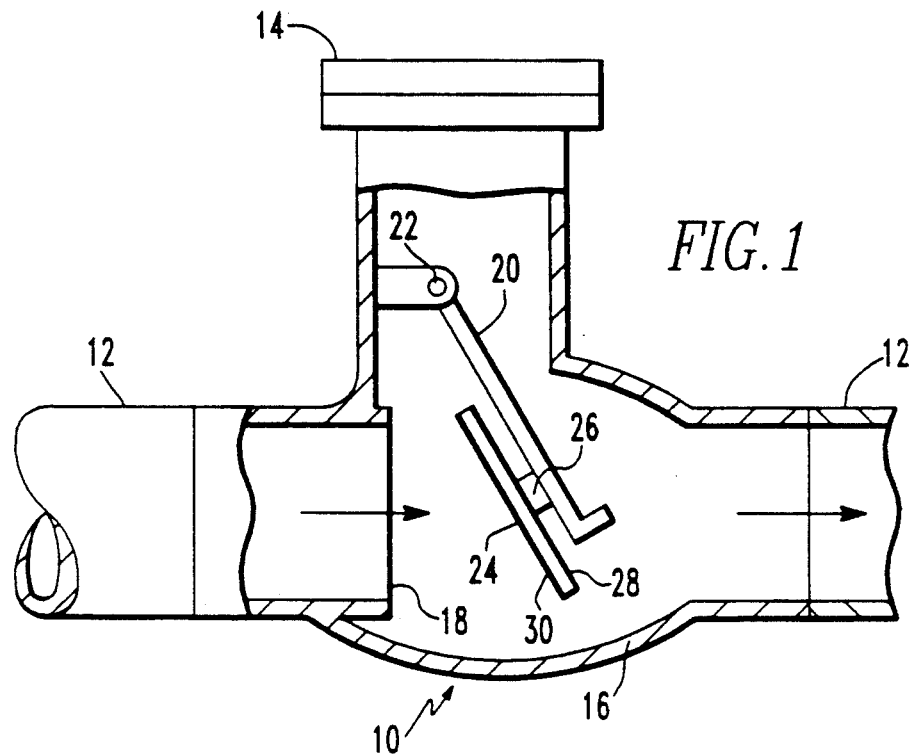
FIG. 1 shows a cut-a-way schematic of a swing type valve embodying the present invention.

FIG. 1 generally shows a swing type check valve 10 in an open position in a pipe 12. The valve 10 connections to the pipe 12 may be welded (as is shown) or may be bolted flanges (not shown). It is to be understood however that other types of valves may be embraced within the scope of this invention.

The valve 10 has a top cover 14 and a valve body 16 containing the internal valve parts, including a valve seat 18. Bolts (not shown) may be used to hold the cover 14 in place. A swinging arm 20 is provided on a hinge pin 22. As shown in FIG. 1, the arm 20 swings to the right side to open and to the left side to close. A valve disc 24 is fastened to the arm 20 by one or more studs 26. The valve disc 24 is dimensioned to seat against the valve seat 18 in a conventional manner when in the closed position. Where a check valve is in a horizontal position (as is shown), the seat 18 may be at a slight angle to the vertical for positive closing. In addition, the arm may be spring biased if desired for positive closing (not shown). Heretofore, commonly used valves have employed mild steel or cast iron parts, including valve bodies, valve seats and valve discs. A valve embodying the present invention has a mild steel or cast iron valve seat. In addition, the valve body can also be mild steel or cast iron. Also, high alloy and stainless steel valve bodies and seats may be employed in many corrosive environments.

A valve embodying the present invention has a valve disc 24 comprising zirconium metal 28 with a zirconium oxide layer 30 on the surface of the disc which shuts against the valve seat 18 when the valve 10 closes. The zirconium may be Zircaloy 2, Zircaloy 4 or other zirconium alloy comprising at least about 90% zirconium. The layer 30 has a thickness of at least 5 ten-thousandths of an inch.

Figure 2:
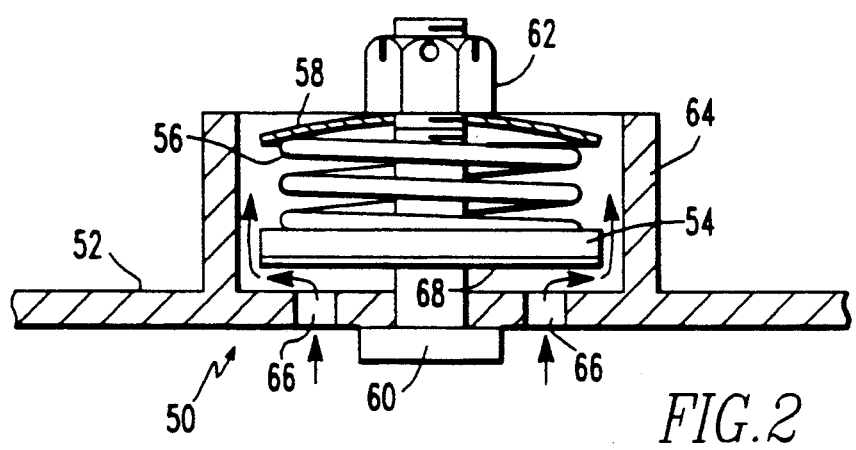
FIG. 2 shows a cut-a-way schematic of a spring biased valve embodying the present invention.

FIG. 2 shows a valve 50 mounted in a vertical position on a valve plate 52 in an open position. The valve 50 generally comprises a movable valve disc 54 biased by a spring 56 and a back support 58, which are fastened together by a shouldered bolt 60 and castle nut 62. Alternatively, the shouldered bolt may have two threaded ends for receiving castle nuts thereon. The valve disc 54 moves vertically within a cavity defined by a wall 64 which may be integrally cast with the valve plate 52. The valve disc 54 is urged upwardly to open (as is shown) by the pressure of fluid flowing upwardly through passageways 66 and against the valve disc 54.

A valve 50 embodying the present invention has a valve disc 54 which is formed of zirconium and may be Zircaloy 2, Zircaloy 4, Zirlo and the like. The valve disc 54 has a zirconium oxide layer 68 which is formed on the surface of the disc 54 which seats against the valve plate 52 and over the passageways 66 to close the valve 50. The balance of the valve 50, including the valve plate 52 (which functions as a valve seat), is generally mild steel or cast iron.

Heretofore (and as was discussed above), spring biased valves similar to the valve shown in FIG. 2, but having mild steel valve discs, were employed to control the flow of hydraulic fluids to seal vacuum pumps used in a chlorine gas service. Trace amounts of chlorine contaminating the hydraulic fluid were found to be dissolving the valve discs after only a few days in service.

Valves of the present invention were backfit in the vacuum pump assembly and were found to last for six (6) months or more. Valve discs for valves having nominal sizes of up to about 3½ inches were cut from zirconium stock material with a numerically controlled waterjet cutter. (The valve discs may also be produced on a punch press or by other suitable means.) The zirconium discs were then heat treated to develop a zirconium oxide surface layer by soaking for about five (5) minutes in a furnace having an air atmosphere at about 1175° F. The zirconium discs were then cooled to ambient temperature in air. A black zirconium oxide layer having a thickness of 5 ten-thousandths and a buff finish formed on the surface of the disc. A similar finish may be produced by heating a zirconium disc in an air atmosphere at about 950° F. to about 1250° F. for a suitable length of time. An oxidized surface may also be produced in pressurized water at a temperature of from about 800° F. to about 900° F.

Without further polishing or otherwise surface treating the zirconium oxide layers, the cooled discs were backfit into the valves. These valves were still operable after six month's service.

While a presently preferred practice of the present invention has been described, it is to be distinctly understood that the improved process is not limited thereto but may be otherwise variously practiced in accordance with the following claims.

We claim:

1. A fluid valve, comprising:

a valve body having a valve seat for receiving a valve disc to close the valve, the valve seat comprised of a material selected from the group iron and steel;

a zirconium valve disc having a zirconium oxide layer, which layer seats against the valve seat when the valve is closed.

2. The valve of claim 1, wherein the thickness of the zirconium oxide layer on the disc is at least about five (5) ten-thousandths of an inch.

3. The valve of claim 1, wherein the thickness of the zirconium oxide layer on the disc is five (5) ten-thousandths of an inch.

4. The valve of claim 1, wherein the valve is a 3½ inch valve.

5. A process for making a valve, comprising the steps of:

soaking a zirconium disc having a surface in air at a temperature of from about 950° F. to about 1250° F. for at least about five (5) minutes to form a black oxide layer having a thickness of at least about five (5) ten-thousandths of an inch on the surface of the disc; and fitting the oxidized surface against a valve seat comprised of a material selected from the groups consisting of iron and steel of a valve body without surface treating the zirconium oxide layer.

* * * * *